(12) United States Patent
Muñoz Muñoz et al.

(10) Patent No.: US 9,588,290 B2
(45) Date of Patent: Mar. 7, 2017

(54) PHOTONIC INTEGRATED DEVICE

(71) Applicant: UNIVERSITAT POLITÉCNICA DE VALÉNCIA, Valencia (ES)

(72) Inventors: Pascual Muñoz Muñoz, Valencia (ES); Bernardo Gargallo Jaquotot, Valenica (ES); Javier Antonio Sanchez Fandiño, Valencia (ES); José Capmany Francoy, Valencia (ES)

(73) Assignee: Universidad Politecnica De Valencia, Valencia (ES)

( * ) Notice: Subject to any disclaimer, the term of this patent is extended or adjusted under 35 U.S.C. 154(b) by 0 days.

(21) Appl. No.: 15/101,469

(22) PCT Filed: Oct. 16, 2014

(86) PCT No.: PCT/ES2014/070782
§ 371 (c)(1),
(2) Date: Jun. 3, 2016

(87) PCT Pub. No.: WO2015/082738
PCT Pub. Date: Jun. 11, 2015

(65) Prior Publication Data
US 2016/0306112 A1    Oct. 20, 2016

(30) Foreign Application Priority Data
Dec. 5, 2013   (ES) .................... 201331792

(51) Int. Cl.
*G02B 6/12*      (2006.01)
*G02B 6/293*     (2006.01)
(52) U.S. Cl.
CPC ...... *G02B 6/12011* (2013.01); *G02B 6/29347* (2013.01)

(58) Field of Classification Search
CPC ......... G02B 2006/12147; G02B 6/262; G02B 6/29347
See application file for complete search history.

(56) References Cited

U.S. PATENT DOCUMENTS

| | | | |
|---|---|---|---|
| 5,002,350 | A | 3/1991 | Dragone |
| 5,450,511 | A | 9/1995 | Dragone |
| 5,513,194 | A | 4/1996 | Tamura et al. |
| 2003/0007728 | A1 | 1/2003 | Uetsuka et al. |

FOREIGN PATENT DOCUMENTS

| | | |
|---|---|---|
| EP | 0454113 A2 | 4/1991 |
| EP | 0639782 A1 | 8/1994 |
| WO | 91/14963 A1 | 10/1991 |
| WO | 02/103449 A1 | 12/2002 |
| WO | 2006111593 A1 | 10/2006 |
| WO | 2008003071 A2 | 1/2008 |

*Primary Examiner* — Thomas A Hollweg
*Assistant Examiner* — Mary A El Shammaa
(74) *Attorney, Agent, or Firm* — McNees Wallace & Nurick LLC

(57) ABSTRACT

This document describes a photonic device which makes it possible to both separate and combine bands of wavelengths in optical signals. To this end, the device described herein has a star coupler, a set of optical input waveguides connected to the input port of the star coupler, a waveguide grouping connected to the output port of the start coupler and a set of reflectors and phase shifters connected to said waveguide grouping. This document also provides details of a manufacturing process of the previously described device and a method for handling optical signals that makes use thereof.

6 Claims, 1 Drawing Sheet

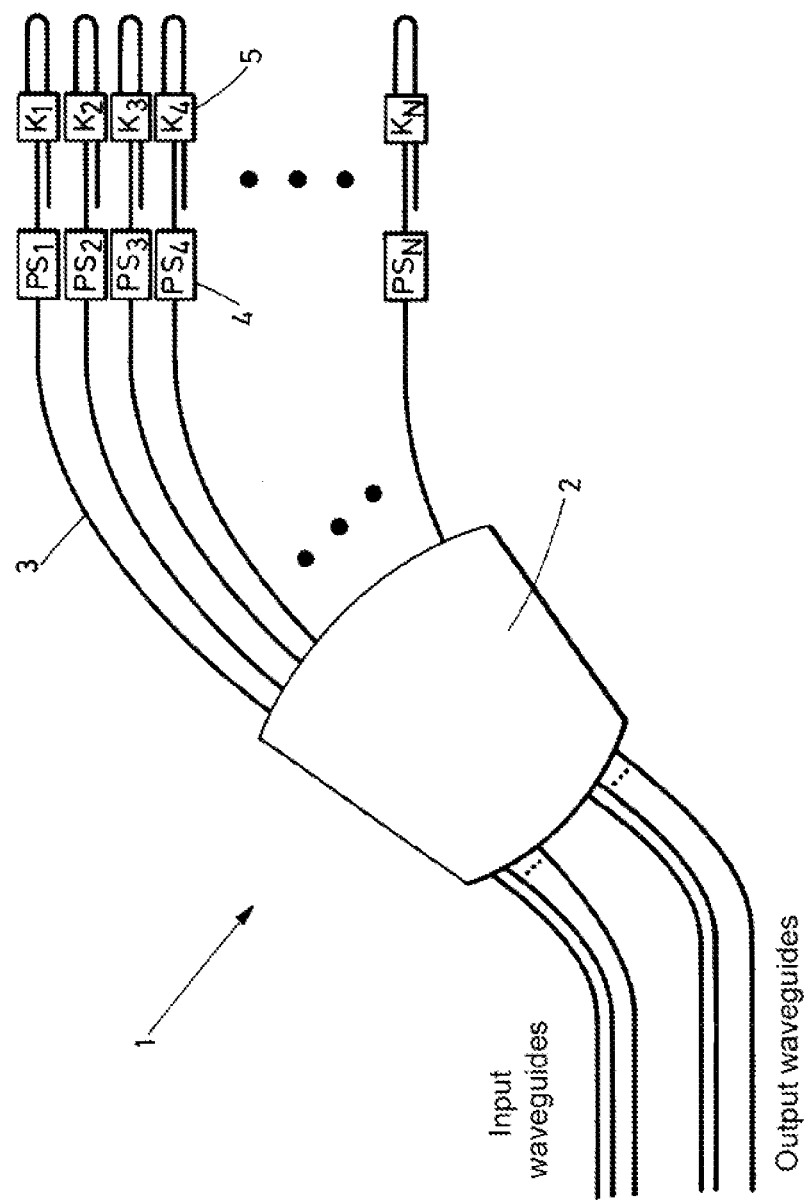

PHOTONIC INTEGRATED DEVICE

The present invention relates to a photonic device, more specifically to a reflective Arrayed Waveguide Grating (AWG) device wherein the reflectors are based on a Sagnac Loop Reflector (SLR).

STATE OF THE ART

Conventional AWG-type photonic devices, R-AWGs based on facet reflectors and grating reflectors are known in the state of the art. In fact, the existence of U.S. Pat. No. 5,002,350, which discloses the original Dragone AWG device, or U.S. Pat. No. 5,450,511, by the same company, which discloses an R-AWG wherein the input and output waveguides are interspersed with reflectors in the output waveguides, is known.

The existence of U.S. Pat. No. 539,650, which discloses a tunable laser wherein the reflector is formed using one side of the chip, is also known. Likewise, the existence of U.S. 2003/007728 A1 is known, which discloses an AWG and its manufacturing method, with a substantially flat response over a band of wavelengths. The device disclosed herein is composed of a substrate, an optical input waveguide for receiving a signal multiplexed into a wavelength, a set of optical output waveguides parallel to the input optical waveguide and connected therewith to a star coupler, a first waveguide grouping connected to the output port of the star coupler with a difference L between consecutive waveguide lengths and a Fabry-Perot resonator formed by a second waveguide grouping connected to the output port of the waveguides of the first grouping with a difference 2L between consecutive waveguide lengths, a metal reflectance film (11% reflectance) on the side in contact with the first array and a metal reflectance film (100% reflectance) on the opposite side.

XP006039590 discloses a multi-wavelength laser which consists of a grouping of Fabry-Perot cavities built between two Sagnac loop reflectors, a frequency selector AWG and semiconductor optical amplifiers (SOA) with half amplification.

In view of these and other documents, it is understood that in patent literature many different ways of implementing the reflectors for the R-AWG can be found, many of which use reflective material on the sides of the chip or photonic crystals, although also external reflectors. Many of these use non-integrated structures and/or additional manufacturing processes.

None of the aforementioned devices allow the modification of the spectrum response of the AWG through the SLR reflectors and, likewise, have very large sizes that condition the applications, manufacturing and use thereof.

DESCRIPTION OF THE INVENTION

The present document describes a reflective Arrayed Waveguide Grating (AWG) type photonic integrated device that may be used to process (multiplex/demultiplex) bands of wavelengths, said device having reflectors based on a Sagnac Loop Reflector (SLR) and the coupling constant of the loop reflector coupler, preferred but not restricted, defined at 0.5. Furthermore and in response to one of the aforementioned size-related problems, it is an R-AWG wherein the reflectors are obtained in the same lithographic process as the AWG.

As indicated previously, the invention object of this report is a reflective AWG which makes it possible to multiplex/demultiplex (combine/separate) bands of wavelengths. The device described herein also makes it possible to obtain a flat response by forcing a sinc-type distribution of the signal in the grouping by modifying the amplitude with the SLRs and the phase with the broadband phase shifters (PS).

The present invention is configured in the manner of an AWG device, which is a photonic integrated device (or photonic integrated circuit (PIC)) which is used to separate/combine bands of wavelengths.

An AWG device is composed of:
- A set of input waveguides connected to the input port of a first star coupler known as Dragone coupler, named after its developer.
- A waveguide grouping connected to the output port of the first star coupler and to the input port of the second star coupler.
- A set of output waveguides connected to the output port of the second star coupler.

In the AWG device, a light signal connected to the input waveguide is spatially separated between the output ports depending on the wavelengths of which the signal is composed (separate, demultiplex). Contrarily, when various signals are introduced through various output ports, they may be combined in one input port (combine, multiplex). The device is passive and reciprocal.

The field at the input port of the first star coupler is diffracted towards the output port (far field) of the slab. This far field is included in the grouping. For the waveguides typically used in PIC technologies, the far field is an extended version of the field in the input waveguide, i.e. it has the same shape (typically, but not necessarily, Gaussian) but widens over a longer angle or length. The mathematical relationship between the field in the input waveguide and the output port of the slab is Fresnel's diffraction integral, which can be approximated by Fourier's transform in the case of most AWG designs. Therefore, the waveguide grouping guide which is located in the centre has the maximum field amplitude, while the amplitude of the other guides will be smaller and related to the central waveguide of the grouping by the shape of the far field (typically, but not necessarily, Gaussian).

The field included in each path of the grouping is subjected to a different phase shift or path travelled. The AWG object of the invention has a configuration that makes it possible for the optical phase difference ($\Delta\Phi$) between consecutive paths in the grouping to be an integer number of times (m) $2\pi$, i.e. $\Delta\Phi = m \cdot 2\pi$, where each path of the grouping consists of a waveguide, phase shifter and reflector, due to which the optical phase difference ($\Delta\Phi$) occurs between each and every one of said elements: the consecutive optical waveguides of the grouping and the phase shifters and reflectors to which said consecutive optical waveguides of the grouping are respectively connected. In general, this implies a difference in length between consecutive waveguides $\Delta L = m \cdot \lambda_0 / n_w$, where the operational wavelength is $\lambda_0$, and where $n_w$ is the effective propagation index in the waveguide. The optical propagation constant in the waveguide is $\beta = 2\pi \cdot n_w / \lambda$, such that the phase difference between consecutive waveguides changes with the wavelength used (linearly with the optical frequency $v = c/\lambda$, where c is the speed of light in a vacuum). This linear phase front, combined in the second star coupler (acting as a spatial Fourier transform), entails the aforementioned separation of the input wavelengths into bands at the output ports of the AWG (the focus point in the different output positions depends on the wavelength/frequency due to the phase difference, dependent on the frequency at which the grouping is introduced).

Another possible configuration for the AWGs is the reflective AWG (R-AWG). In this case, the device has a configuration equal to half of the AWG device and optical reflectors equal to half of the grouping are used. In this manner, the signal travels towards the reflectors and is sent back to the input star coupler.

The device described herein consists of optical waveguides which are manufactured from different substrates using different techniques, such as lithography techniques. In the device of the present invention, as indicated throughout this document, reflectors which are Sagnac interferometers are used. Given that this interferometer is also formed by optical waveguides, it is possible to manufacture the device with its different parts and the reflector simultaneously in a single process and substrate, without need for additional manufacturing processes and/or steps.

Throughout the description and claims, the word "comprises" and its variants do not intend to exclude other technical characteristics, additives, components or steps. For the persons skilled in the art, other objects, advantages and characteristics of the invention shall be inferred partly from the description and partly from the practice of the invention. The following examples and figures are provided by way of illustration and do not intend to limit the present invention.

BRIEF DESCRIPTION OF THE DRAWINGS

FIG. 1 Shows a schematic view of the device object of the invention, wherein its various constituent components and arrangement thereof can be observed.

EXAMPLES

Following is an illustration of the invention by means of assays conducted by the inventors which prove the effectiveness of the product of the invention.

The present invention consists of a photonic integrated device (1) for processing bands of AWG or R-AWG type wavelengths comprising at least one reflector (5) which is manufactured in the same lithographic process as the device (1), which has a layout such as that observed in FIG. 1. The reflectors (5) are based on a Sagnac Loop Reflector (SLR). The reflective device (1) comprises a star coupler (2) which may have one or two input waveguides and two output waveguides, 1×2 and 2×2 couplers, respectively. The two output waveguides are interconnected forming a loop, as shown in FIG. 1. When the coupling constant (K) of the star coupler (2) is equal to 0.5, total reflection occurs in the SLR reflector (5), i.e. all the light introduced in one of the input waveguides is reflected towards the same input port. The coupler may be implemented in different ways: directional coupler (DC), wavelength insensitive coupler (WINO) or multimode interference coupler (MMI). In the case of the present invention, a broadband coupler that maintains a wide range of wavelengths for a single coupling is required. Therefore, both the WINO and MMI couplers may be used. MMIs are generally smallest in size once integrated in any of the integration technologies. When K is not equal to 0.5, the amount of power reflected by the SLR towards the input port is not 100%. It is well known in the state of the art that MMIs can be designed to obtain the desired coupling constant.

The operating principle of the AWG requires that the difference between the optical phases (ΔΦ) of at least two consecutive guides in the waveguide grouping (3) must be an integer number of times (m) 2π, i.e. ΔΦ=m·2π. In any case, the phase difference depends on all the structures penetrated by the light.

The most general case of the present invention is shown in each path in the waveguide grouping (3) and is composed of: optical waveguide, phase shifting section (PS) and SLR reflector (5). The phase shift in waveguide number 'i' (i=1 . . . N) is: $\Phi_i = \Phi_{w,i} + \Phi_{PS,i} + \Phi_{SLR,i}$, where $\Phi_{w,i}$ is the optical phase shift in the waveguide that connects the star coupler to the phase shifter, $\Phi_{PS,i}$ is the optical phase shift in the phase shifter and $\Phi_{SLR,i}$ is the optical phase shift in the Sagnac reflector (5).

The SLR reflector (5) has a field transfer function (amplitude and phase) that depends both on the coupler and on the waveguide that forms the loop. In the general case, each path may have a different SLR, due to which, in order to maintain the phase relationship ΔΦ between consecutive guides (i.e. $\Delta\Phi = \Phi_{i+1} - \Phi_i$) different PSs must be used in each path.

As in the case of the star coupler (2), the PS must be broadband, i.e. it must maintain the phase difference in a wide range of wavelengths. The broadband PS can be implemented using normal waveguides or including the modification in the centre of the waveguide.

SRAWG Gaussian Response

The simplest embodiment of the present invention uses identical SLR reflectors (5) in all the paths (waveguide, phase shifter (4), reflector (5)) of the waveguide grouping (3). The SLR reflector (5) comprises a 1×2 coupler with coupling constant K=0.5. In this manner, all the power entering the SLR reflector (5) is reflected towards the input port. Since all the SLR reflectors (5) are identical, the field incident upon the SLR reflectors (5) will ideally have the same variation in terms of amplitude and phase in all the paths of the waveguide grouping (3).

Therefore, in this embodiment in particular, the SLR reflector (5) acts only as a light reflector. When the amplitude in any path of the waveguide grouping (3) is not altered by any structure and the phase relationship between consecutive waveguides is ΔΦ, the spectrum bands have a Gaussian shape. The operating mode and spectrum shape in the passbands of the device (1) acting as SRAWG are equivalent to those of the normal and reflectant AWGs: the device (1) operates as a multiplexor/demultiplexor of bands of wavelengths and the spectrum bands have the shape of a Gaussian function.

SRAWG Flat Spectrum Response

Different techniques exist for adjusting the spectrum response of the AWG, the least used being the modification of the amplitude and phase of the field distribution in the waveguide grouping (3). The far field in the star coupler (2) follows a Fourier transform relationship with respect to the field in the input waveguide. In signal theory it is known that the Fourier transform of a sinc function is a rectangular function.

The R-AWG device (1) functions as follows. The light injected by one of its input waveguides is propagated by the star coupler (2) (slab coupler) and feeds each of the waveguides of a waveguide grouping (3), as described previously (also called Gaussian beams). For each waveguide, light is propagated firstly towards the Sagnac reflectors (5). When the light reaches the input port of the Sagnac reflector (5) it is divided into two parts by the reflector coupler, which may differ according to the coupling constant of said reflector coupler. Each of said parts travels through the reflector (5) loop in a direction opposite that in which it closes on the same reflector (5) coupler. In this manner, said parts interfere back in the input waveguide of the reflector (5) coupler, with an electric field amplitude and phase relationship dependent on the coupling constant of said coupler. Light then travels back, in the opposite direction towards the star coupler (2). This occurs in all the waveguides of the waveguide grouping (3) and their respective Sagnac reflectors (5). The star coupler (2) will combine the field of all the waveguides and direct it towards the output waveguides. The effect produced by the star coupler (2) in said combination shall be a function of the phase relationship between the waveguides of the waveguide grouping (3). In the aforementioned case, where the phase relationship between consecutive guides of the waveguide grouping (3) is an integer number of times (m) $2\pi$, the effect is the separation (demultiplexation) of the different wavelengths of the light in the optical input waveguide of the R-AWG, between the different optical output waveguides.

The invention claimed is:

1. A photonic integrated device for processing bands of wavelengths, characterised in that it comprises:
    at least one star coupler and,
    at least one optical input waveguide, connected to at least one input port of the star coupler,
    at least one optical output waveguide connected to at least one output port of the star coupler,
    a waveguide grouping connected to at least one output port of the star coupler, and
    at least one phase shifter disposed in each of the waveguides of the waveguide grouping,
    device characterised in that it comprises, disposed after the phase shifter and at an end opposite that in which it connects each waveguide of the waveguide grouping to the star coupler, more than one optical reflector based on a Sagnac Loop Reflector (SLR), being an optical coupler which in turn comprises at least one input waveguide of the reflector and two output waveguides of the reflector where the two output waveguides of the reflector are disposed interconnected forming a loop; wherein each loop of each reflector has different lengths.

2. The photonic integrated device, according to claim 1, characterised in that the coupling constant of the loop reflector coupler is comprised between 0 and 1.

3. The photonic integrated device, according to claim 2, characterised in that the coupling constant of the loop reflector coupler is equal to 0.5.

4. The photonic integrated device, according to claim 1, characterised in that it comprises an optical phase difference ($\Delta\Phi$) between two consecutive optical guides of the waveguide grouping, phase shifters and reflectors whereto said consecutive optical waveguides of the waveguide grouping are respectively connected, where said difference is equal to an integer number of times (m) $2\pi$, i.e. $\Delta\Phi=m\cdot2\pi$.

5. The photonic integrated device, according to claim 2, characterised in that it comprises an optical phase difference ($\Delta\Phi$) between two consecutive optical guides of the waveguide grouping, phase shifters and reflectors whereto said consecutive optical waveguides of the waveguide grouping are respectively connected, where said difference is equal to an integer number of times (m) $2\pi$, i.e. $\Delta\Phi=m\cdot2\pi$.

6. The photonic integrated device, according to claim 3, characterised in that it comprises an optical phase difference ($\Delta\Phi$) between two consecutive optical guides of the waveguide grouping, phase shifters and reflectors whereto said consecutive optical waveguides of the waveguide grouping are respectively connected, where said difference is equal to an integer number of times (m) $2\pi$, i.e. $\Delta\Phi=m\cdot2\pi$.

* * * * *